April 13, 1948.

L. A. SMITH 2,439,615

PEDESTAL MOUNTED, CIRCUMFERENTIALLY TRAVELING
SHOE TYPE, TIRE MOUNTING DEVICE

Filed Nov. 24, 1944

INVENTOR.
LEON A. SMITH
BY John H. Leonard
ATTORNEY

April 13, 1948.                    L. A. SMITH                    2,439,615
         PEDESTAL MOUNTED, CIRCUMFERENTIALLY TRAVELING
               SHOE TYPE, TIRE MOUNTING DEVICE
                    Filed Nov. 24, 1944              4 Sheets-Sheet 2

INVENTOR.
LEON A. SMITH
BY
ATTORNEY

April 13, 1948.  L. A. SMITH  2,439,615
PEDESTAL MOUNTED, CIRCUMFERENTIALLY TRAVELING
SHOE TYPE, TIRE MOUNTING DEVICE
Filed Nov. 24, 1944  4 Sheets-Sheet 3
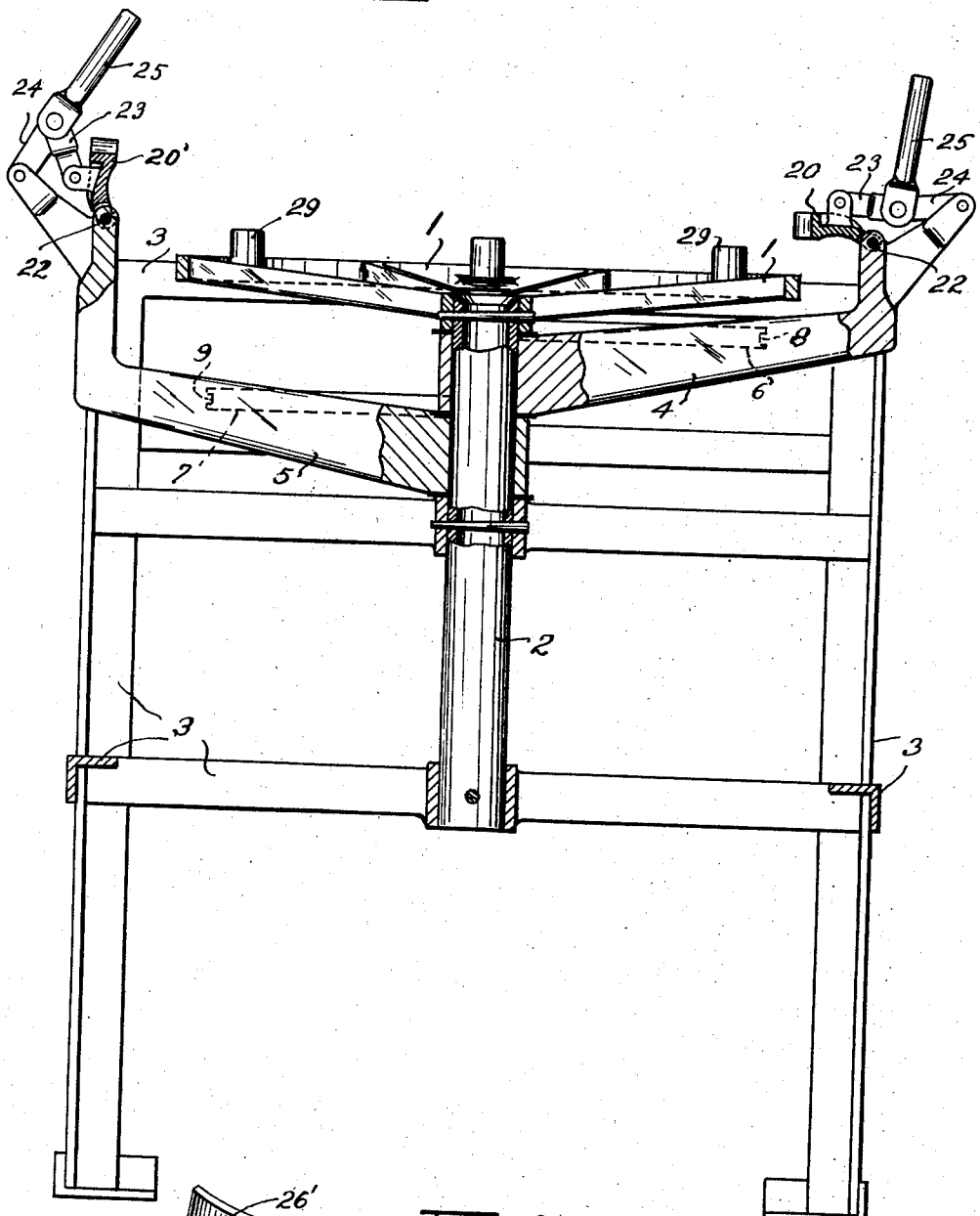
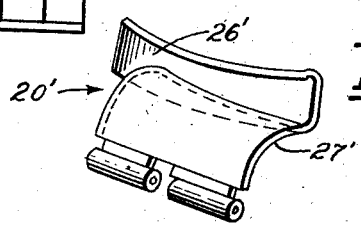
INVENTOR.
LEON A SMITH
BY
ATTORNEY

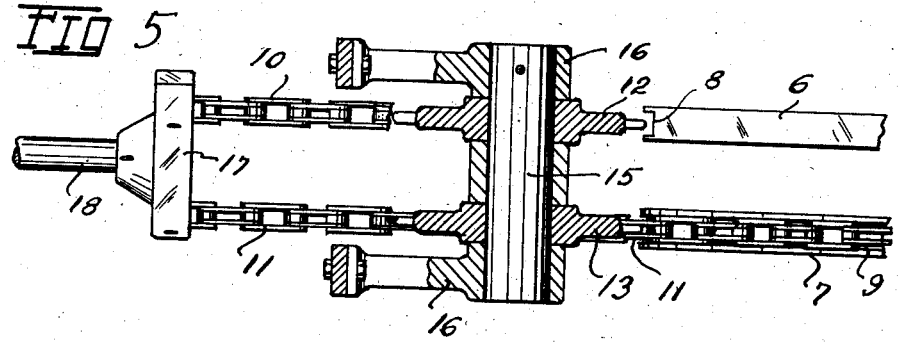
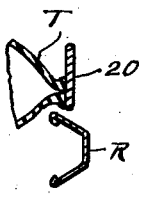
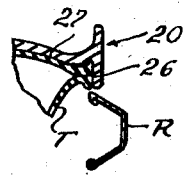
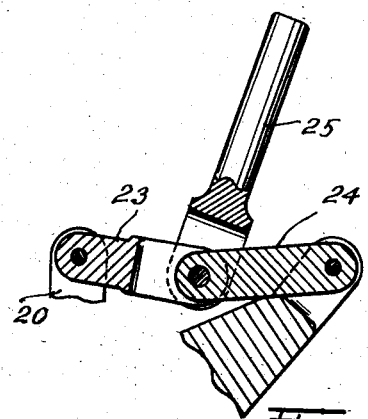
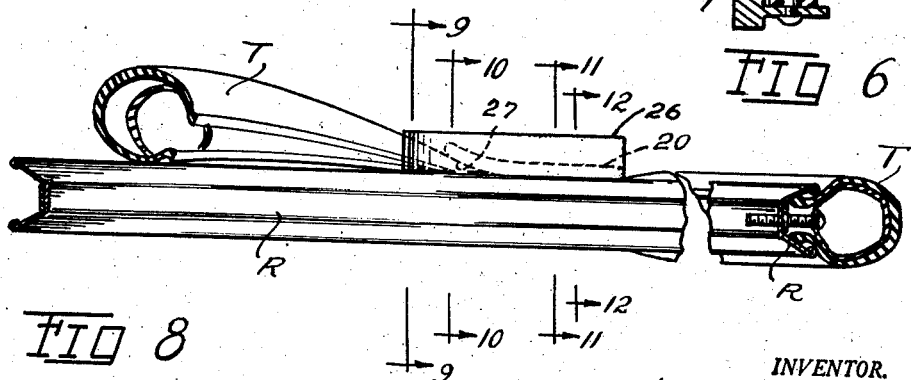

Patented Apr. 13, 1948

2,439,615

UNITED STATES PATENT OFFICE 2,439,615

PEDESTAL MOUNTED CIRCUMFERENTIALLY TRAVELING SHOE TYPE TIRE MOUNTING DEVICE

Leon A. Smith, Shelby, Ohio, assignor to The Shelby Cycle Company, Shelby, Ohio, a corporation of Ohio Application November 24, 1944, Serial No. 564,917

4 Claims. (Cl. 157—6)

This invention relates to a machine for mounting tires on rims and particularly to a machine for mounting bicycle tires on the rims of completely assembled bicycle wheels.

One of the principal objects of the invention is to provide a simple device for installing a tire on the rim of a bicycle wheel with the minimum of manual manipulation of the tire.

A more specific object is to provide, for installing a tire on the rim, a power operated machine which reduces the possibilities of marring the tire or the rim to a minimum.

Another specific object is to provide a machine for the purposes described in which the wheel on which the tire is to be installed can be easily mounted and secured in place preparatory to the tire installing operation.

Other objects and advantages will become apparent from the following description in which reference is made to the drawings, in which Fig. 1 is a side elevation of a preferred embodiment of the present invention;

Fig. 4 is a vertical sectional view taken on a plane indicated by the line 4—4 on Figs. 1 and 3;

Figure 3:
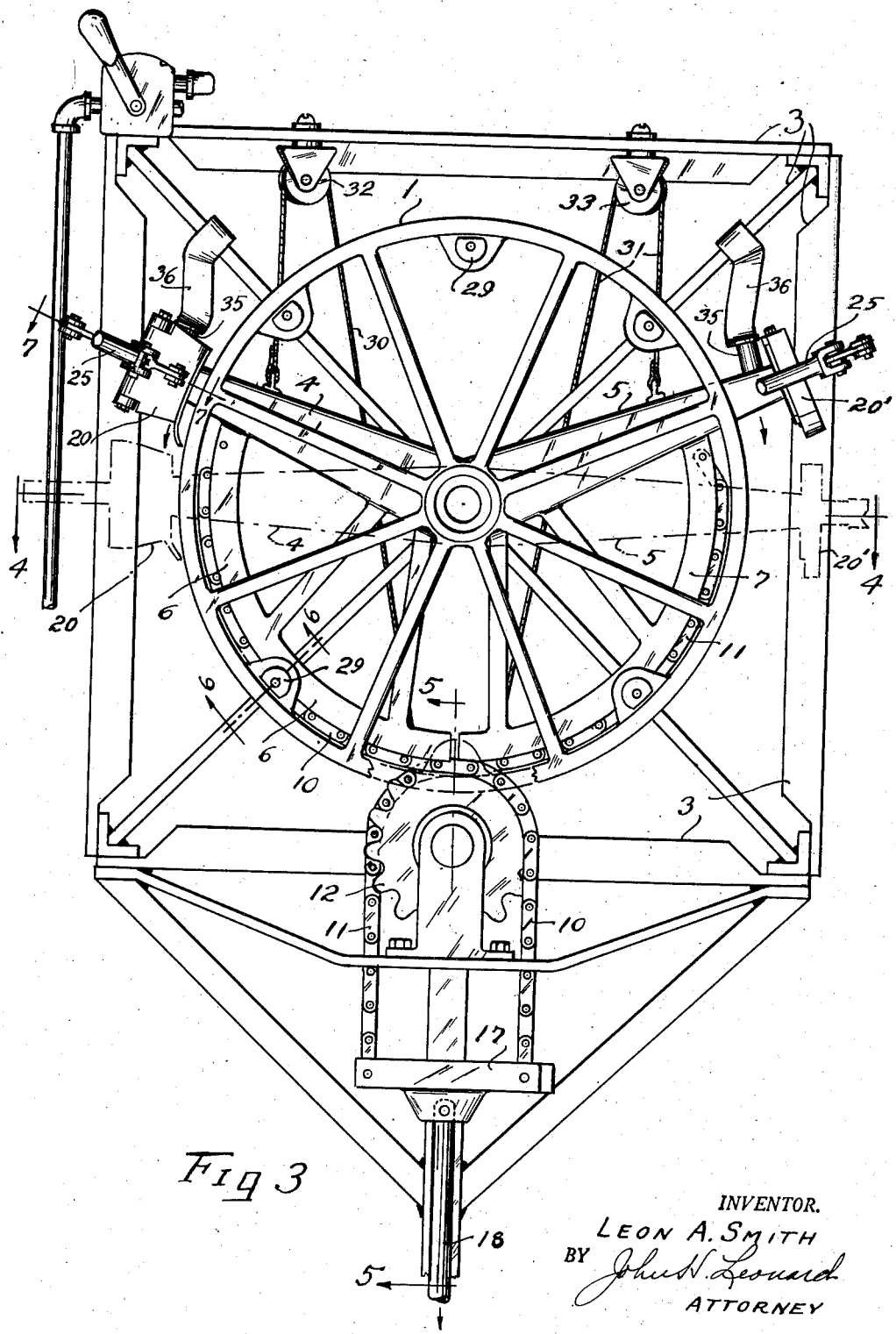
Fig. 3 is a top plan view of the mechanism illustrated in Fig. 2 and includes, additionally, portions of the power applying mechanism.

Figs 5, 6 and 7 are fragmentary vertical sectional detail views taken on planes indicated by lines 5—5, 6—6 and 7—7, respectively, of Fig. 3;

Fig. 8 is a vertical sectional view through a rim and a tire which is being installed thereon, illustrating the operation of the tire installing shoes of the machine the shoe being shown diagrammatically for clearness in illustration;

Figs. 9 through 12, inclusive, are fragmentary sectional views taken on planes indicated by the lines 9—9, 10—10, 11—11 and 12—12, respectively, of Fig. 8; and Fig. 13 is a perspective view of one of the tire applying shoes of the present invention.

Figure 1:
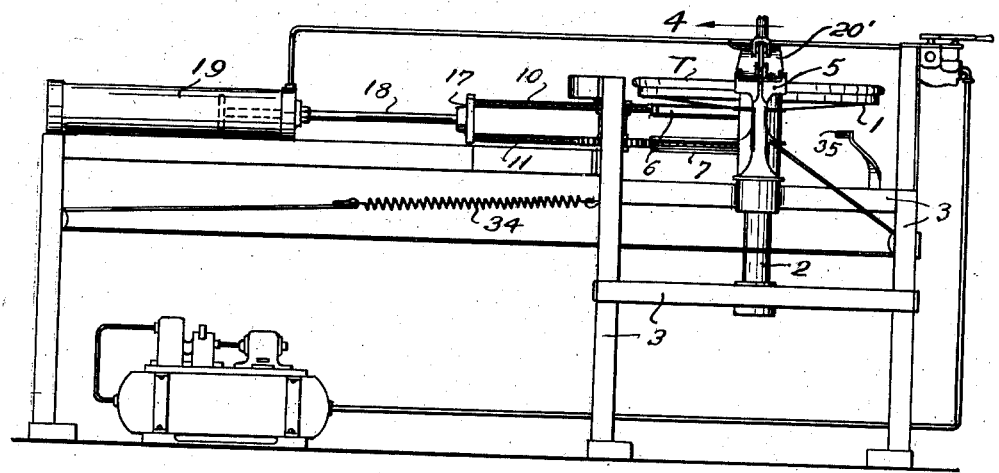
Figure 2:
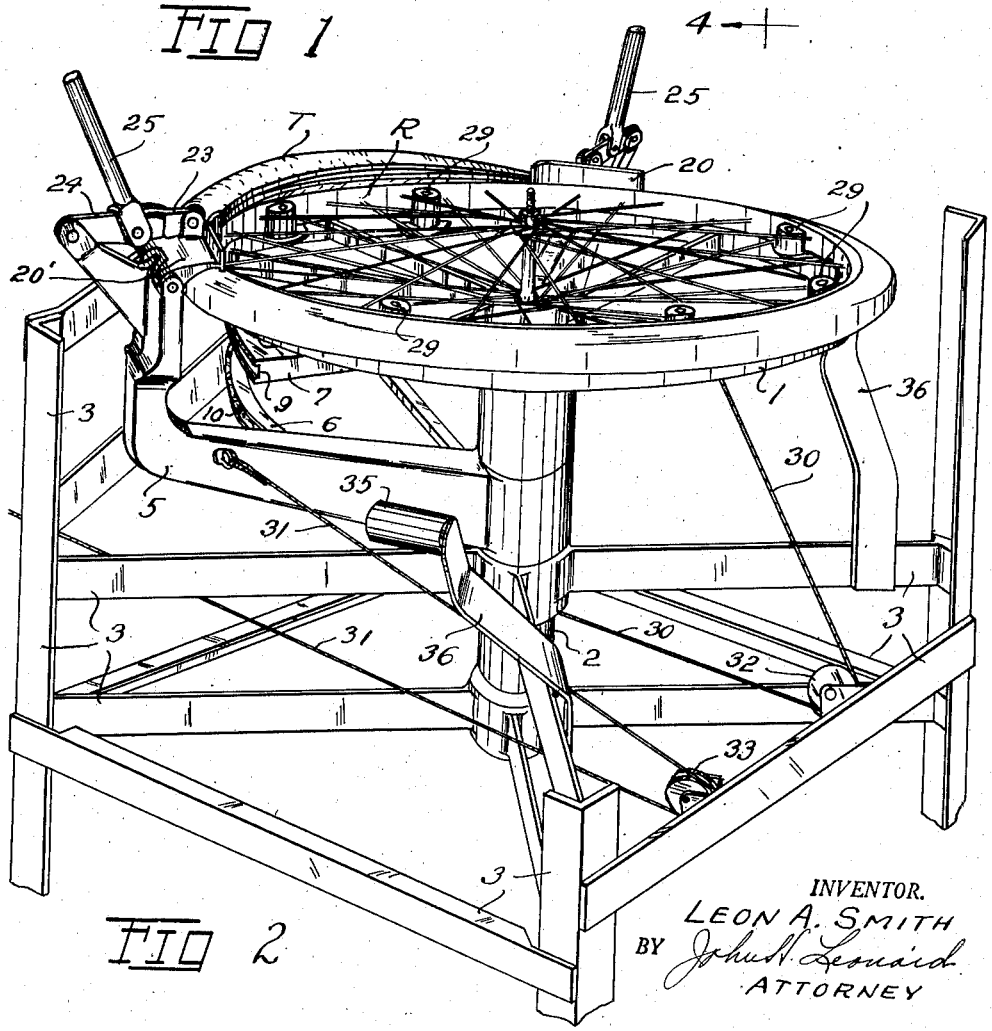
Fig. 2 is a perspective view of the mechanism illustrated at the right in Fig. 1, showing a tire in the process of being installed.

Referring particularly to Figs. 1 and 2, the machine comprises a support or table 1 which is arranged to support a bicycle type of wheel with its axis disposed vertically and in a substantially fixed position radially except for a limited movement later to be described. The table 1 is supported on an upright post 2 which, in turn, is supported on a suitable framework 3. The post 2 is in a position concentric with the position which the axis of the wheel is to occupy when the wheel is mounted on the table preparatory to installing a tire.

Mounted on the post 2 for swinging movement about its axis are radially extending sweep arms 4 and 5 which extend outwardly radially beyond the limits of the table 1 and the rim of the wheel which is supported thereon. The arms are arranged for concurrent swinging movement in opposite directions about the post 2 from a starting position, such as illustrated by full lines in Fig. 3, past the relative position of the arms shown on Fig. 2 to a final position, not illustrated; and during this movement the tire is progressively installed on the rim.

In order to drive the arms 4 and 5 in fixed timed relation to each other the arms are provided with segmental wheel or disc elements 6 and 7, respectively, which terminates inside of the periphery limit of the table 1 and provide other peripheral channels 8 and 9, respectively, each of which channels is adapted to receive and partially support a flexible driving member such as a sprocket chain. The chains 10 and 11 pass in opposite circumferential directions in and about the channels of the segmental discs 6 and 7, respectively, and each is secured at one end to its associated disc. At their free ends the chains pass in opposite directions around coaxial guiding sprockets 12 and 13, respectively, which are mounted for independent rotation about an upright pivot 15 supported in the frame 3 in suitable brackets 16 on said frame. The chains 10 and 11, in turn, are fastened at their free ends to the opposite ends of a yoke or head 17 which is connected to a draw bar 18 of a power operated ram 19.

In order to obtain swinging movement of the arms 4 and 5 and bring them close together to their final position, the arms are spaced one above the other and the segmental discs also are spaced axially of the post 2 so as to lie in different planes and permit relative passage.

Carried on the extremities of the arms 4 and 5 are tire installing shoes 20 and 20', respectively. Since the shoes 20 and 20' are the same in function, the shoe 20 only will be described in detail. As illustrated in Figs. 1, 2 and 4, the shoe 20 is mounted on a pivot 22 on the arm 4 for swinging movement inwardly and toward the support 1 and outwardly away therefrom. For operating the shoe from one extreme position to the other a toggle mechanism, including links 23 and 24 and an operating lever 25 is provided. The toggle mechanism, as will be clear from Figs. 4 and 7, holds the shoe fixedly in the extreme working position (at the right, Fig. 4) into which the shoe is moved. The shoe 20 has a peripheral spiral expanding surface 26 which is substantially coaxial with the post 2 and expands radially from the leading to the trailing edge of the shoe, its leading edge being radially inwardly from the periphery of the rim R installed on the table 1, when the shoe 20 is moved to its lowered or tire applying position. The trailing edge lies radially outwardly beyond the periphery of the rim R so as to expand the tire beyond the rim as the trailing edge passes therealong. The peripheral guiding surface of the shoe is smooth and polished so as to slide readily along the tire and, in working position, it terminates axially slightly above the upper limit of the rim R. Reference is directed to Figs. 9 to 12 showing the progressive action of the tire applying surfaces of the shoe in mounting the tire.

Formed on each shoe in fixed relation to the surface 26 is a cam surface 27 which is arranged to engage the upper surface of a tire to be installed and slide therealong as the arms swing from starting to final position. This surface 27 slopes downwardly or toward the support 1 from its leading edge to its trailing edge a sufficient distance so that at the trailing edge the upper bead of the tire T to be installed is forced downwardly against the inner bead of the tire and both are forced together below the upper bead of the rim R on which the tire T is to be installed. At the trailing edge the under surface of the cam 27 is at or below the level of the lower edge of the peripheral expanding surface 26 of the shoe so that as the arms 4 and 5 are swung relatively together to move the shoes toward each other, the tire T is expanded and pressed toward the table so as to snap into place on the rim. The shoe 20' is best illustrated in Fig. 13 and has a peripheral spiral expanding surface 26' and cam surface 27'. The surfaces 26' and 27' correspond in function to the surfaces 26 and 27 respectively but are oppositely arranged so that when the shoes 20 and 20' swing concurrently in opposite directions about the axis of the shaft 2, the shoes coact in the same manner with the particular portions of the tire which they engage. The surface 26' expands radially from its leading to its trailing edge and the surface 27' slopes downwardly from its leading to its trailing edge. The movement of the arms is such that the shoes can swing into contact with each other at their leading edges so as to substantially dispose the entire tire on the rim. If the permitted concurrent movement of the shoes does not completely install the tire, it is only necessary to press a short uninstalled portion of the tire downwardly to cause it to be disengaged from the shoes and snap into place.

Means are provided on the table or support 1 for supporting the rim R at the coaxial position described but with slight lateral movement radially so that it can adjust itself readily during the tire installing operation to the peripheral surfaces of the shoes.

In order to support the rim R with its outer peripheral surface close to the continuation of the surfaces 26 of the shoes 20 and 20', a number of upright fingers, one of which is shown in detail in Fig. 6, are provided on the upper surface of the table. Each of the fingers comprises an upright pin 28 on which resilient rubber supporting sleeves, forming rim locating posts 29, are mounted. The posts 29 are uniformly distributed about the periphery of the support 1 in a position to engage with slight yielding pressure the inner surface of the rim R on which the tire T is to be installed and support the rim R with its outermost peripheral surface substantially in continuation of the trailing edges of the surfaces 26 of the shoes, as described, when the shoes are in the tire installing position. The toggles above described are so arranged as to lift the shoes upwardly and outwardly clear of the support as illustrated by the shoe 20' in Fig. 4 so as to afford easy access to the support for placing thereon a completed wheel on the rim R of which a tire T is to be installed, and for enabling the wheel to be readily removed after installation of the tire.

In order to return the arms 4 and 5 to starting position, suitable cables 30 and 31 are secured to the arms, respectively, and are led through suitable pulleys 32 and 33 to a return spring 34 which is stretched as the arms are swung toward their final tire installing position by the ram 19. Since the return is rapid, rubber shock absorbers, such as illustrated at 35, are provided in positions to engage the respective arms upon their return movement. The shock absorbers 35 preferably are mounted on resilient arms 36 which hold them in position and assist in relieving the shock imposed by the returning arms.

As illustrated in Figs. 2, 4 and 8 to 12, inclusive, when it is desired to install a tire on a rim the toggles are operated to dispose the shoes 20 and 20' outwardly from the support 1 whereupon the assembled wheel may be laid in position upon the support 1 and held closely in place by the posts 29. During this installation, the arms 4 and 5 are in the starting position illustrated in Fig. 3. The wheel is preferably arranged with the valve stem disposed between the arms 4 and 5 in the starting position of said arms. In Fig. 3 this position is at the extreme right of the support between the shock absorbers 35. The tire casing with the tube installed is placed partly on the rim with the valve stem inserted through the rim in the usual manner as illustrated in Fig. 8, as though the tire were to be installed by hand and the tire is actually installed by hand part way from the valve stem to a point beneath the starting position of the shoes 20 and 20'. Thereupon the toggles are operated to dispose the shoes against the tire in operating position for effecting engagement of the tire and rim in which position they are held by the movement of the toggles beyond dead center. Thereupon power is applied by the ram 19 to the draw bar 18 and through the medium of the chains 10 and 11 is transmitted to the arms 4 and 5 causing them to swing toward each other from their starting positions about the periphery of the rim and to their final position. During this operation the inner periphery of the tire is engaged by the expanding surfaces 26 and 26' and the cam surfaces 27 and 27' concurrently and thereby is forced downwardly so as to dispose the beads of the tire T between the flanges of the rim R. This action continues and the tire is progressively installed as the shoes are swung toward each other in a fixed relationship so that substantially the same amount of tire is installed by each shoe as they approach the final position.

If the entire tire is not installed by bringing the shoes together in the final position, it is supported so that a slight pressure axially of the wheel can cause the remaining inch or so of tire to slide over the rim into position to snap thereonto. Upon release of the power by the ram 19 the arms are returned to their starting position by the spring 34 and the toggles are operated to remove the shoes whereupon the rim may be removed and the operation repeated. The resiliency of the post 29 affords slight radial movement of the rim so that the ram can adjust itself to any minor variations in tire or rim. Also they support the rim with a minimum danger to marring of the surface.

I claim:

1. A tire mounting machine comprising a supporting table, a pair of arms, means supporting the arms for swinging movement toward and away from each other about an axis normal to the plane of the table, rim engaging means on the table for holding a rim thereon with its axis substantially coincident with said first mentioned axis, means operatively connected to said arms for swinging the arms concurrently in a fixed relation toward each other from a starting to a final position, said means comprising segmental discs fixed to the arms respectively and coaxial therewith and spaced apart from each other axially, and having peripheral guideways, flexible members secured at one end to the discs, respectively, and accommodated in the guideways, means to exert a pull on the flexible members for swinging the arms from a starting to a final position, tire applying means carried by the arms, respectively, and operative upon swinging of the arms from starting to final position to effect progressive engagement of a tire with said rim.

2. A tire mounting machine comprising a supporting table, a pair of arms, means supporting the arms for swinging movement toward and away from each other about an axis normal to the plane of the table, rim engaging means on the table for holding a rim thereon with its axis substantially coincident with said first mentioned axis, means operatively connected to said arms for swinging the arms concurrently in a fixed relation toward each other from a starting to a final position, said means comprising segmental discs fixed to the arms respectively and coaxial therewith, said segmental discs having peripheral channel guideways, sprocket chains secured at one end to the segmental discs and accommodated in the guideways, sprockets in engagement with the chains beyond the path of the discs for guiding the free ends of the chains radially from said axis, a single driving means connected to the free ends of the chains beyond the sprockets for applying a pull on the chains to swing the arms, and tire applying means carried by the arms, respectively, and operative upon swinging of the arms from starting to final position to effect progressive engagement of a tire with said rim.

3. A tire mounting machine comprising a supporting table, a pair of arms, means supporting the arms for swinging movement toward and away from each other about an axis normal to the plane of the table, rim engaging means on the table for holding a rim thereon with its axis substantially coincident with said first mentioned axis, means operatively connected to said arms for swinging the arms concurrently in a fixed relation toward each other from a starting to a final position, said means comprising segmental discs fixed to the arms respectively and coaxial therewith and spaced apart from each other axially, and having peripheral guideways, flexible members secured at one end to the discs, respectively, and accommodated in the guideways, and means to exert a pull on the flexible members for swinging the arms from a starting to a final position, cables connected to the arms for swinging the arms to starting position, a tension spring connected to the cables and stressed upon swinging the arms toward final position for operating the cables to return the arms, and tire applying means carried by the arms, respectively, and operative upon swinging of the arms from starting to final position to effect progressive engagement of a tire with said rim.

4. In a tire mounting machine including a table, an arm, means mounting the arm for swinging movement about an axis normal to the plane of the table, rim engaging means on the table for holding a rim thereon with its axis substantially coincident with said first mentioned axis, means for swinging said arm from a starting to a final position, and tire applying means carried by said arm and operable by swinging of the arm from starting to final position to effect progressive engagement of a tire with said rim, said tire applying means comprising a rigid shoe having a spirally curved peripheral expanding surface which expands radially of the said axis from its leading to its trailing edge and is positioned above the plane of the top of the rim with its leading edge disposed inwardly of the rim and its trailing edge outwardly thereof, and having a tire engaging cam surface sloping downwardly toward the plane of the table from its leading toward its trailing edge, said cam surface terminating at its trailing edge approximately at the level of the lower edge of the trailing end of the expanding surface, means connecting the shoe to said arm for swinging movement into operative and inoperative positions, and means for moving and holding said shoe in said positions selectively.

LEON A. SMITH.

REFERENCES CITED

The following references are of record in the file of this patent:

UNITED STATES PATENTS

| Number | Name | Date |
|---|---|---|
| 555,480 | Grant | Feb. 25, 1896 |
| 595,548 | Rodgers | Dec. 14, 1897 |
| 668,067 | Stutsman | Feb. 12, 1901 |
| 1,025,987 | Long | May 14, 1912 |
| 1,416,094 | Krauska | May 16, 1922 |
| 1,497,034 | Singleton | June 10, 1924 |
| 1,742,590 | Freivogel | Jan. 7, 1930 |
| 1,944,266 | Potter | Jan. 23, 1934 |
| 1,966,766 | Raby et al. | July 17, 1934 |
| 2,178,101 | Hatch | Oct. 31, 1939 |

FOREIGN PATENTS

| Number | Country | Date |
|---|---|---|
| 246,853 | Great Britain | May 6, 1926 |